Dec. 24, 1957  M. A. LUCE  2,817,357
PILOT CONTROLLED FLEXIBLE VALVE
Filed Nov. 17, 1951  3 Sheets-Sheet 1
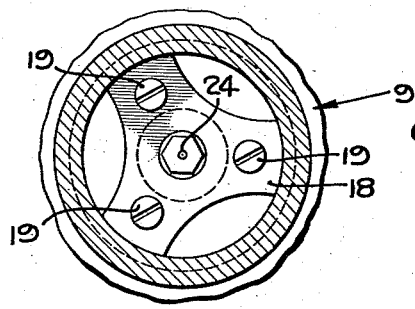
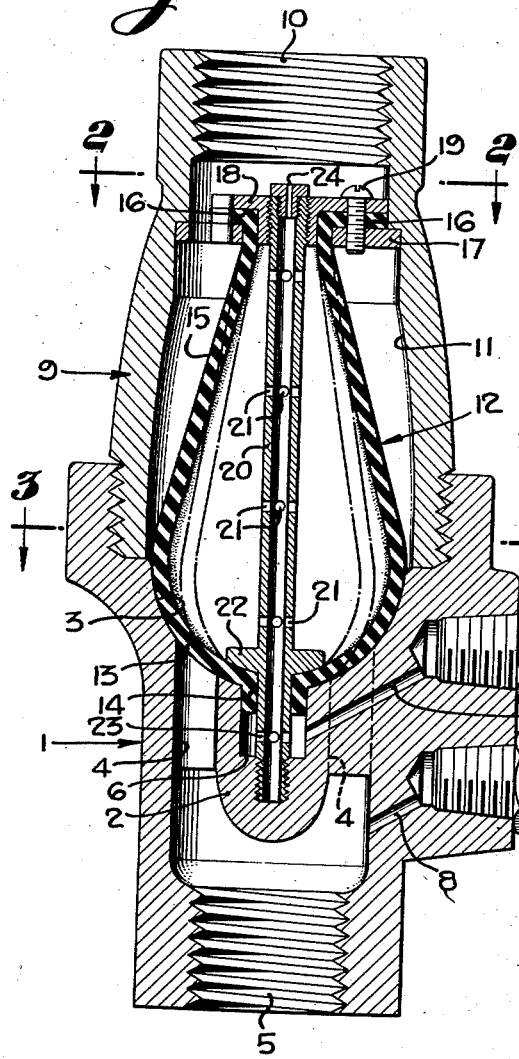
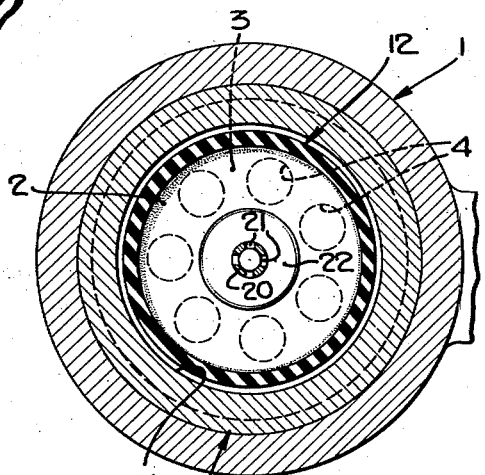
MILTON A. LUCE
INVENTOR.
BY Lyon & Lyon
ATTORNEYS Dec. 24, 1957 M. A. LUCE 2,817,357
PILOT CONTROLLED FLEXIBLE VALVE
Filed Nov. 17, 1951 3 Sheets-Sheet 2

MILTON A. LUCE
INVENTOR.

BY Lyon & Lyon
ATTORNEYS

Dec. 24, 1957     M. A. LUCE     2,817,357
PILOT CONTROLLED FLEXIBLE VALVE
Filed Nov. 17, 1951     3 Sheets-Sheet 3
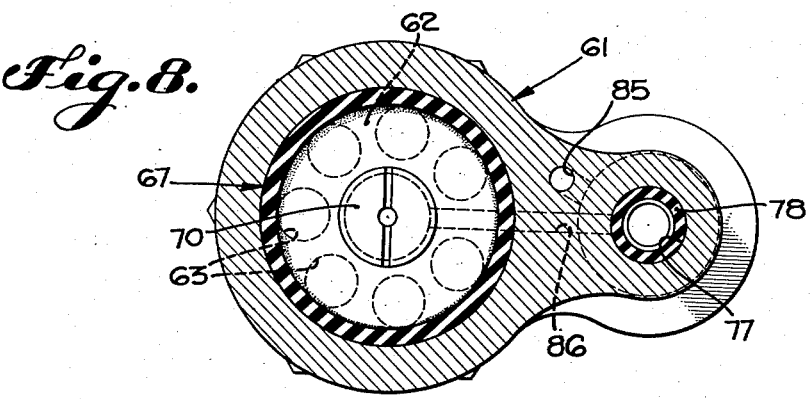
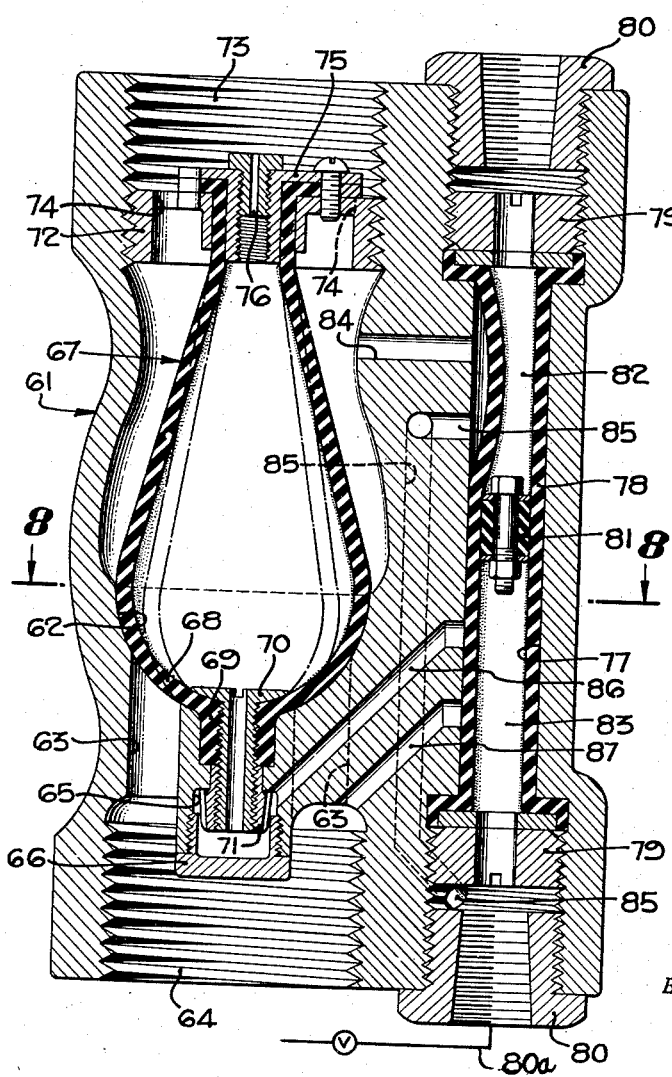
MILTON A. LUCE
INVENTOR.
BY *Lyon & Lyon*
ATTORNEYS

United States Patent Office 2,817,357
Patented Dec. 24, 1957

2,817,357
PILOT CONTROLLED FLEXIBLE VALVE

Milton A. Luce, Los Angeles, Calif.

Application November 17, 1951, Serial No. 256,924

9 Claims. (Cl. 137—491)

My invention relates to valves and included in the objects of my invention are:

First, to provide a valve which has an extremely wide range of application, both as to size and to type of use; that is, to provide a valve which may be made small enough to control a half-inch pipe line or large enough to control conduits several feet in diameter, or which may be designed to control either liquids or gases at pressures ranging from very low values to extremely high values, or which may be employed as a simple check valve or adapted to use as a regulator valve or a pilot control valve.

Second, to provide a valve which incorporates a novel hollow flexible bag-like diaphragm adapted to be subjected internally to the pressure of the fluid in the line controlled by the valve, thereby to effect closure.

Third, to provide a valve which involves a minimum number of parts requiring a minimum amount of machining or other high precision operations whereby the valve is relatively inexpensive to manufacture, this being accomplished without detracting from the efficiency of operation.

Fourth, to provide a valve of this character, which is capable of being adapted to the control of all classes of liquids or gases, whether containing chemically active substances or entrained abrasive material.

With the above and other objects in view as may appear hereinafter, reference is made to the accompanying drawings, in which:

Figure 1 is a longitudinal sectional view of one form of my valve.

Figure 2 is a transverse sectional view through 2—2 of Figure 1.

Figure 3 is a transverse sectional view through 3—3 of Figure 1.

Figure 7 is a longitudinal sectional view of a further modified form of my valve.

Figure 8 is a transverse sectional view through 8—8 of Figure 7.

Figure 4:
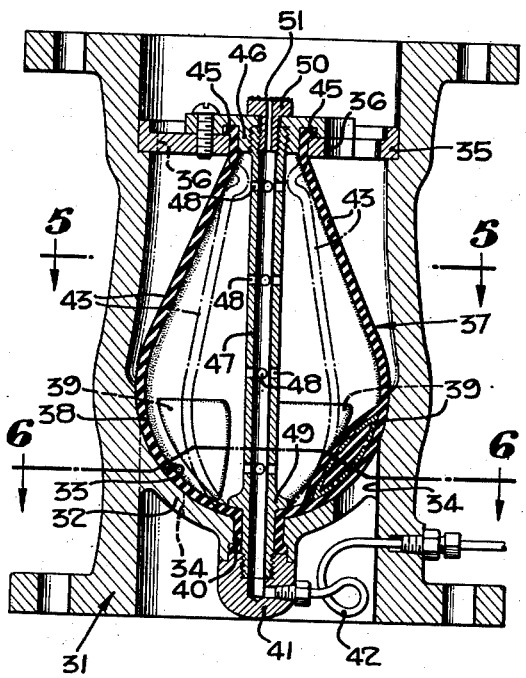
Figure 4 is a longitudinal sectional view through a modified form of my valve.

Reference is first directed to the construction shown in Figures 1, 2 and 3.

A valve body 1 is provided. The valve body defines a longitudinally extending flow passage divided by a partition 2, in which is formed a valve seat 3 in the form of a hemispherical socket facing toward the upstream or inlet side of the valve body. The valve seat is intersected by a ring of axially directed ports 4, which communicate with the downstream or outlet side 5 of the valve body.

The base of the valve seat 2 within the ring of ports 4 is provided with a recess 6 which communicates with a laterally directed pilot controlled outlet passage 7. A pilot controlled inlet passage 8 is provided in the valve body below the passage 7 and communicates with the outlet 5. The purpose of these passages will be brought out hereinafter.

The upper end of the valve body 1 is internally threaded or otherwise formed for connection to a tubular housing 9. The upper end of the housing 9 is provided with an inlet 10. Below the inlet 10, the inner walls of the housing 9 define a guide bore 11.

Mounted within the housing 9 is a valve element 12 which is in the form of a hollow pear shaped bag formed of flexible material such as rubber or rubber-like material. The lower portion of the valve element is hemispherical, as indicated by 13, and is capable of sealing engagement with the valve seat. The hemispherical portion 13 of the valve element 12 is so proportioned that it normally conforms to the valve seat 3 without stretching or expansion so that the material need not stretch or be subject to tension in order to seat. At the center of its lower extremity the valve element is provided with a hollow boss 14 which fits into the recess 6.

The side walls 15 of the valve element above the seat portion 13, are frusto-conical and the upper extremity of the valve element is provided with a flange 16. The flanged upper end of the valve element is clamped between a spider 17 and a clamping ring 18, slidably mounted in the guide bore 11. Flow passages are provided around the spider 17 between the inlet 10 and the annular space between the valve element 12 and housing 9. Screws 19 secure the spider and clamping ring so as to sealingly engage the valve element.

The clamping ring 18 is provided with a depending boss having an internally threaded opening which receives the upper end of a tube 20. The tube 20 extends downwardly through the valve body and is provided with lateral ports 21. Near its lower end, it is provided with a flange 22, which bears against the inner surface of the hemispherical portion 13 above the hollow boss 14, the lower extremity of the tube being threaded to screw into a corresponding threaded continuation of the recess 6, so that the flange 22 clamps and seals the central portion of the valve element to the valve seat. Ports 23 communicate with the chamber formed between the tube 20 and the recess 6.

The upper or inlet end of the tube 20 is provided with an orifice or meter element 24 having a bore smaller than the passages 7 and 8. The passages 7 and 8 are connected respectively by a pilot supply line 25 and pilot return line 26, to a pilot valve 27. The pilot valve per se, is conventional, and is employed to control the flow from the passage 7. The pilot valve may vary from a simple valve having merely an "off" and "on" position, to a small regulator valve subject to a variable intended to influence flow through the valve body 1.

Operation of my valve as shown in Figures 1 to 3 is as follows:

If the passage 7 is closed, fluid, whether gas or liquid, cannot escape from the valve element, consequently, the pressure within the valve element equalizes the pressure existing above and around the valve element causing the valve element to seat so as to expand and close the ports 4. If the outlet passage 7 is open and permits flow at a greater rate than that permitted by the meter element 24, the pressure within the valve element 12 is reduced as compared to the pressure outside the valve element, causing it to collapse radially as indicated by broken lines. When this occurs, the ports 4 are opened and flow through the valve is permitted. By regulating the rate at which fluid enters or escapes from the valve element 12, the rate at which the valve opens or closes may be controlled so that the valve may be caused to open or close slowly or quickly. Still further, the extent to which the valve element 12 will collapse is dependent upon the relative pressure between the inside and the outside of the valve element, so that by controlling this relative pressure the valve may be employed to regulate flow as distinguished from a valve which merely has a fully "on" or "off" position.

Figure 5:
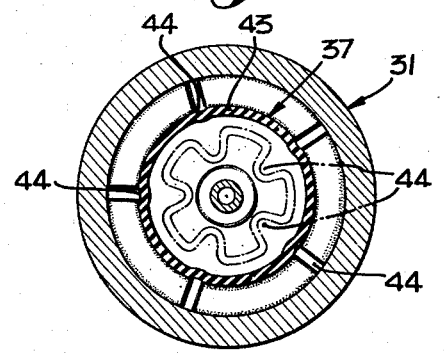
Figure 5 is a transverse sectional view through 5—5 of Figure 4.
Figure 6:
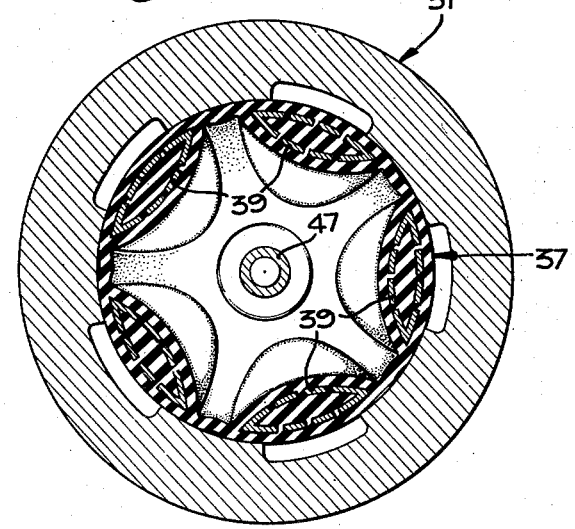
Figure 6 is a transverse sectional view through 6—6 of Figure 4.

Reference is now directed to Figures 4, 5 and 6.

The valve here shown is particularly adapted for valves of large size. A valve body 31 having a longitudinally directed flow passage is provided. The flow passage is interrupted by a partition 32 having a hemispherical valve seat or socket 33, intersected by a ring of ports 34. In the upstream side and spaced from the partition 32 is a second partition 35 which may be removably mounted. The partition 35 is provided with ports 36.

Mounted between the partitions is a hollow valve element 37 which is pear shaped as in the first described structure. The valve element includes a hemispherical lower portion 38 which coacts with the seat 33. In order that the valve may be employed to control relatively high pressures, the hemispherical portion 38 may be provided with reinforcements 39 located in registry with the several ports 34. As shown, the reinforcements may take the form of spherical segments of appropriate dimensions joined to form lens-like structures which may be imbedded in the material of the valve element. The reinforcements may be perforated to improve the bond.

The lower end of the valve element is provided with a tubular boss 40, flanged at its extremity. The boss fits into a central aperture provided in the partition 32. This aperture is provided with a cap 41, which secures and seals the flanged end of the boss 40. In the case of valves of large size, a pilot line 42 of metal tubing communicates with the cap 41 and extends laterally from the valve body for communication with a pilot valve as in the first described structure. The pilot valve and the return line therefrom, are omitted.

The valve element 37 is provided above its seat portion 38, with frusto-conical sides 43. Formed in the sides of the valve element are fold initiating grooves 44, positioned so as to be directed between reinforcements 39. The upper end of the valve element is flanged as indicated by 45, protrudes through the partition 35, and is secured and sealed thereto by a clamping plate 46. A tube 47 extends from the clamping plate 46 axially through the valve element and engages and is threaded into the cap 41. The tube 47 is provided with perforations 48 for communication with the interior of the valve element and is provided with a flange 49 which bears against the central portion of the hemispherical valve seat 38 to firmly clamp and seal the tubular boss 40, in place.

An orifice or meter element 50 is provided at the upper end of the tube 47. A screen 51 may enclose the orifice valve 50. Operation of the valve shown in Figures 4, 5 and 6, is essentially the same as in the previously described structure. It should be pointed out that valves of the type shown in Figures 4 through 6 may be several feet in diameter. The only regions of the valve element subjected to appreciable pressure differentials are the regions overlying the ports 34. Inasmuch as these regions may be adequately reinforced, it follows that the valve may be employed to control large volumes at substantial pressure differentials. Conversely, the valve element may be made relatively thin and highly flexible, so that it may be employed to control fluids at very low pressure differentials.

Reference is now directed to the construction shown in Figures 7 and 8.

This construction involves a valve body 61 having a longitudinal passage divided by a partition in which is formed a hemispherical valve seat 62 in the manner of the preceding structures. The valve seat is intersected by a ring of ports 63 which communicate with an outlet 64. A central bore 65 is provided within the ring of ports 63. The central bore is closed at its lower or downstream end by a cap 66. The pear shaped hollow valve element 67, similar to the previously described structures, is contained in the valve body above or upstream of the valve seat 62. The valve element includes a hemispherical portion 68 having a depending hollow boss 69 which fits in the central bore 65 and is secured by a flanged and threaded stem 70 and clamp nut 71. The stem 70 is tubular, to provide communication between the interior of the valve element and the chamber formed by the lower end of the bore 65 and the cap 66.

In this construction the upper end of the valve element fits within a mounting ring 72 which is threaded to fit within the threaded inlet 73 of the valve body. The mounting ring is provided with ports 74 and receives a clamp ring 75, which by means of appropriate bolts or screws, secures and seals the upper end of the valve element. A meter element 76 fitted in the clamp ring communicates with the interior of the valve element.

The valve structure shown in Figures 7 and 8 involves the use of a special control unit which is shown as incorporated integrally in the valve body. However, the control unit may be located at a remote station. The control unit includes means defining a bore 77, in which is fitted a flexible tube 78 adapted to line the bore. The extremities of the tube 78 are flanged and are sealed in place by ported sealing screws 79, threaded into the extremities of the bore 77. Outwardly of the screws 79, the bore receives fittings 80.

The valve tube 78 is provided with a plug or partition 81 at its mid-portion, dividing the valve tube into upper and lower valve sections 82 and 83 respectively. That portion of the bore 77 opposite the valve section 82 is provided with a passage 84 which communicates with the main flow passage of the valve body 61 at the upstream side of the valve seat 62. A passage 85 communicates with the bore 77 adjacent but spaced from passage 84, and extends to the lower end of the bore 77 so as to communicate therewith below the valve section 83. A passage 86 communicates between the region of the valve section 83 and the chamber formed by the bore 65 and cap 66. A fourth passage 87 communicates between the region of the valve section 83 and the downstream or outlet side of the valve body 61. The passages 84, 86 and 87, may be relatively short ports in the integral housing shown, or may be extended lines if it is desired to place the control unit at a remote point.

Operation of the valve shown in Figures 7 and 8 is as follows:

The valve element 67 responds in the same manner as the valve element disclosed in the preceding structures. However, the control unit may be variously employed to cause operation of the valve in response to different sets of conditions.

For example: the upper valve section 82 may be connected to a pressure source, not shown, and the lower section sealed except for a bleed or drain line 80a, indicated diagrammatically in Fig. 7. With this arrangement, reduction in pressure at the pressure source reduces the pressure in the valve section 82 so as to connect the valve section 83 through passages 84 and 85, with the upstream side of the valve element 67. The pressure so applied closes passages 86 and 87 so as to cause the valve element 67 to close. Increased pressure in section 82 closes passages 84 and 85 and the resulting relief of the pressure in valve section 83 through the drain line 80a will cause this section to collapse so that passages 86 and 87 are connected, permitting fluid to bleed from within the valve element 67 and cause the valve element to open. This arrangement may be employed where it is desired to close the main valve in the event of a break in the downstream side thereof. This is accomplished by connecting the valve section 82 to an appropriate point downstream of the main valve.

A second arrangement is similar to that shown in conjunction with the first described structure. In this arrangement, the passage 85 is sealed so that the main valve is affected only by pressure in the valve section 83, in which case, the line 80a is used both to bleed and to supply pressure to the interior of section 83. Pressure in the section 83 closes communication between passages 86 and 87 so as to prevent the bleeding of fluid from within the main valve and effect closure of the main valve. Bleeding of pressure through line 80a permits contraction of the section 83, thus connecting passages 86 and 87 so that fluid may be bled from the main valve and permit the main valve to open.

The hollow bulbous inflatable valve elements 12, 37 or 67, as the case may be, are preferably formed of rubber or synthetic rubber and may vary in thickness and flexibility, and may or may not contain reinforcing, as dictated by the type of service for which it is designed.

Furthermore, these valve elements are at no time subjected to internal pressure in excess of the external pressure thereon, except those portions bridging the slots, holes, or ports in the valve seats, and are so constructed that normally (that is, without interior-exterior pressure differentials) they conform substantially to their valve seats.

When the valve elements are open the external pressure in each case exceeds the internal pressure, causing the valve elements to fold radially inwardly and subjecting the material comprising their walls to compressional rather than tensional loads. Thus, the valve elements may occupy either open or closed positions indefinitely without deterioration or plastic flow of the flexible material.

Having fully described my invention, it is to be understood that I do not wish to be limited to the details herein set forth, but my invention is of the full scope of the appended claims.

I claim:

1. A valve structure, involving: a housing defining a flow passage, a partition in said flow passage having a concave seat at its upstream side intersected by a ring of ports communicating through said partition; a bulbous hollow valve element secured to said partition within said ring of ports; means defining a bleed passage communicating from the interior of said valve element to the exterior of said housing; means for metering fluid into said valve element; and means for controlling said bleed passage to effect filling and draining of said valve element thereby to expand and cover said ports and contract and expose said ports, said valve element having relatively rigid reinforcing means overlying said ports, and longitudinally directed fold initiating grooves to effect contraction of said valve element in a predetermined pattern.

2. A valve structure, comprising: a housing defining a valve chamber, a coaxial inlet and outlet at opposite axial ends of said valve chamber, a ported concave valve seat between said inlet and outlet, a flexible hollow bulbous valve element mounted in said chamber upstream of said seat, said valve element having a downstream end conforming, when unflexed, to and normally engageable with said seat to seal the ports in said seat whereby, when the fluid pressure internally of said valve element is equal to the fluid pressure externally of said valve element, said valve element seals said ports, means for controlling ingress of fluid to said valve element to equalize the fluid pressure internally and externally of said valve element thereby to close said ports, means for controlling egress of fluid from said valve element to reduce the pressure internally of said valve element, thereby to effect radial contraction of said valve element in response to pressure externally of said valve element thereby to open said ports, said valve element when contracted forming a central core in said valve chamber around which fluid may flow axially through said valve chamber.

3. A valve structure, comprising: a housing defining a valve chamber, a coaxial inlet and outlet at opposite axial ends of said valve chamber, a ported concave valve seat between said inlet and outlet and facing upstream, a flexible substantially non-stretchable hollow normally bulbous valve element mounted in said valve chamber upstream of said seat, said valve element having a downstream end normally conforming to and mating with said seat to seal the ports in said seat when the pressures internally and externally of said valve element are substantially equal, means for subjecting the interior of said valve element to a pressure equal to the pressure externally of said valve element in the surrounding valve chamber whereby said valve element assumes its unflexed bulbous form and seals said ports, and means for reducing the fluid pressure within said valve element below the fluid pressure in said valve chamber to effect radial contraction of said valve element to open the ports in said seat, said valve element when contracted forming a central core in said valve chamber around which fluid may flow axially through said valve chamber.

4. A valve structure, comprising: a housing defining a valve chamber, a coaxial inlet and outlet at opposite axial ends of said valve chamber, a concave seat between said inlet and outlet facing upstream in said flow passage, a ring of ports perforating said valve seat, a hollow flexible substantially non-stretchable, generally pear-shaped, valve element having a generally hemispherical valve face conforming to and mating with said valve seat to seal said ports when unflexed and when the fluid pressures internally and externally of said valve element are substantially equal, restricted means of communication between the interior of said valve element and the upstream side of said valve seat to permit equalization of the pressure in the interior and on the exterior of said valve element to effect closure of said ports, means securing said valve element in contact with the central portion of said seat, and means for bleeding fluid from the interior of said valve element through said central portion of said seat to effect contraction of said valve element, said valve element when contracted forming a central core in said valve chamber around which fluid may flow axially through said valve chamber.

5. A valve structure, comprising: a housing defining a flow passage, a partition in said flow passage having a concave seat at its upstream side perforated by a ring of ports, a flexible bulbous substantially non-stretchable hollow valve element fixedly mounted within said flow passage and having a downstream end normally closing said ports when unflexed but capable of collapsing internally to open said ports, a hollow stem within said valve element, said stem having ports communicating with the interior of said valve element, and means for controlling ingress of fluid to said stem and the interior of said valve element to seat said valve element and close said ports and egress of fluid therefrom to effect collapse of said valve element to open said ports.

6. A valve structure, involving: a housing having a valve chamber and a substantially hemispherical socket at the downstream end of said chamber having a ring of ports communicating downstream therefrom; a flexible bulbous substantially non-stretchable hollow fluid-receiving valve element having a downstream end and an upstream end; means securing said downstream end within said ring of ports, said downstream end normally covering and sealingly engaging said ports when unflexed and when the pressure within said valve element equals the pressure upstream of said ports, said valve element being radially contractable to uncover said ports; means for supporting the upstream end of said valve element in fixed relation to its secured downstream end; and means for controlling fluid pressure within said valve element to close and open said ports; said valve element, when contracted, forming a central core in said valve chamber around which fluid may flow axially through said valve chamber.

7. A valve structure, involving: a housing having a valve chamber and a substantially hemispherical socket at the downstream end of said chamber having a ring or ports communicating downstream therefrom; a bulbous substantially non-stretchable hollow fluid-receiving valve element having a downstream end and an upstream end; means securing said downstream end within said ring of ports, said downstream end normally covering and sealingly engaging said ports when unflexed and when the pressure within said valve element equals the pressure upstream of said ports, said valve element being radially contractable to uncover said ports; means for supporting the upstream end of said valve element in fixed relation to its secured downstream end; means for admitting fluid to said valve element from upstream of said valve seat to close said ports; and means for bleeding fluid from said valve element to effect constriction of said valve element thereby to open said ports; said valve element, when contracted, forming a central core in said valve chamber around which fluid may flow axially through said valve chamber.

8. A valve comprising a case, an inlet to said case, an outlet from said case, a spider in said case adjacent the outlet, a hub in said spider, a spherical valve seat, a central opening in said seat, a bulb, said bulb having a spherical wall conforming to said spherical seat, said spherical seat separating said case into an upstream chamber and a downstream chamber, a conical extension extending from said spherical wall, said bulb being disposed in said upstream chamber, an opening in said bulb registering with said opening in said spherical valve seat, a rod extending through said bulb, a fluid seal between one end of said bulb and one end of said rod, a collar adjacent the other end of said rod, said bulb at said opening being clamped between said collar and said valve seat, a screw connection between said rod and said hub, a bore through said rod, one end of said bore being in fluid communication with said upstream chamber, side ports in said rod, connecting said bore with the interior of said bulb, a restricted orifice in said bore between said one end and said ports, and means for bleeding pressure from the other end of said bore in said rod to said downstream chamber, to withdraw the spherical wall of said bulb from said spherical valve seat.

9. A valve mechanism comprising a valve case, a fixed partition in said case separating said case into an upstream chamber and a downstream chamber, an inlet to said upstream chamber, an outlet from said downstream chamber, a port in said partition, a third chamber, a flexible wall for said third chamber, said wall separating the latter from said upstream chamber, said wall being contoured to contact said partition at said port to close said port on its upstream side, a conduit connecting said upstream chamber with the said third chamber, means in said conduit producing a pressure drop therein, an outlet conduit connected to said third chamber, and means for bleeding pressure from said outlet conduit to said downstream chamber to withdraw said flexible wall from said partition and open said port.

References Cited in the file of this patent

UNITED STATES PATENTS

| | | |
|---|---|---|
| 1,269,721 | Kuntny | June 18, 1918 |
| 1,636,662 | Larner | July 19, 1927 |
| 1,711,234 | Langdon | Apr. 30, 1929 |
| 2,236,477 | Fuchs | Mar. 25, 1941 |
| 2,247,363 | Dunn | July 1, 1941 |
| 2,336,450 | Voorhess | Dec. 7, 1943 |
| 2,474,355 | Griswold | June 28, 1949 |
| 2,487,226 | Eastman | Nov. 8, 1949 |
| 2,556,596 | Perkins et al. | June 12, 1951 |
| 2,573,712 | Kalam | Nov. 6, 1951 |
| 2,594,132 | Dalrymple | Apr. 22, 1952 |
| 2,642,890 | Skewis | June 23, 1953 |

FOREIGN PATENTS

| | | |
|---|---|---|
| 954,333 | France | June 6, 1949 |